United States Patent
Gade et al.

(10) Patent No.: US 8,134,941 B2
(45) Date of Patent: Mar. 13, 2012

(54) POWER SAVING IN SIGNAL PROCESSING IN RECEIVERS

(75) Inventors: Morten Gade, Aalborg (DK); Kim Schneider, Aalborg (DK); Thomas Hjort Christensen, Scottsdale, AZ (US); Frank Fitzek, Aalborg (DK); Ole Olsen, Gistrup (DK)

(73) Assignee: Freescale Semiconductor, Inc., Austin, TX (US)

( * ) Notice: Subject to any disclaimer, the term of this patent is extended or adjusted under 35 U.S.C. 154(b) by 816 days.

(21) Appl. No.: 12/066,436

(22) PCT Filed: Sep. 12, 2005

(86) PCT No.: PCT/EP2005/054524
§ 371 (c)(1), (2), (4) Date: Aug. 11, 2008

(87) PCT Pub. No.: WO2007/031114
PCT Pub. Date: Mar. 22, 2007

(65) Prior Publication Data
US 2008/0301477 A1 Dec. 4, 2008

(51) Int. Cl.
G06F 1/32 (2006.01)
H04W 4/00 (2009.01)
G08C 17/00 (2006.01)
(52) U.S. Cl. .................................. 370/311; 370/318
(58) Field of Classification Search .................. None
See application file for complete search history.

(56) References Cited

U.S. PATENT DOCUMENTS

| 5,701,329 A | 12/1997 | Croft et al. |
| 6,694,146 B1 | 2/2004 | Hardin et al. |
| 2007/0074264 A1* | 3/2007 | Vesma et al. ................... 725/135 |
| 2007/0101228 A1* | 5/2007 | Vesma et al. ................... 714/752 |
| 2007/0240027 A1* | 10/2007 | Vesma et al. ................... 714/759 |
| 2008/0282310 A1* | 11/2008 | Koppelaar et al. ............. 725/118 |
| 2009/0055715 A1* | 2/2009 | Jashek et al. ................... 714/776 |
| 2009/0185079 A1* | 7/2009 | Yun et al. ....................... 348/731 |
| 2009/0268648 A1* | 10/2009 | Tardy et al. .................... 370/310 |

FOREIGN PATENT DOCUMENTS

EP 0656693 B1 5/2002

OTHER PUBLICATIONS

Balaguer et al;"Performance Evaluation of Power Saving Strategies for DVB-H Series using adaptive MPE-FEC Decoding" Personal, Indoor and Mobile Radio Communications, 2005. PIMRC 2005. IEEE 16th International Symposium vol. 4, Sep. 11-14, 2005 pp. 2221-2226.
Digital Video Broadfcasting (DVB); "Framing structure, channel coding and modulation for digital terrestrial television" Nov. 2004; ETSI EN 300 744—European Telecommunication Standards Institute.
Digital Video Broadcasting (DVB); "Transmission System for Handheld Terminals (DVB-H)"; ETSI EN 302 304—European Telecommunication Standards Institute, Nov. 2004.

* cited by examiner

*Primary Examiner* — Chi Pham
*Assistant Examiner* — Soon-Dong Hyun

(57) ABSTRACT

A method of receiving a signal in bursts including frames each including payload data and error correction data received in separate time periods, the bursts being separated by time intervals during which power is saved by disabling at least some signal processing components of the receiver, signal processing components of the receiver are disabled to save power before all the error correction data for all the frames in the burst is received.

20 Claims, 5 Drawing Sheets

POWER SAVING IN SIGNAL PROCESSING IN RECEIVERS

FIELD OF THE INVENTION

This invention relates to receivers where data in the received signals is organised in frames each comprising payload data and error correction data received in separate time periods. More particularly, but not exclusively, the invention relates to power saving in signal processing of receivers operating according to the Digital Video Broadcast-Handheld standard ('DVB-H') of the European Telecommunication Standards Institute ('ETSI') and will be described with reference to that standard although it will be understood that the invention is also applicable to other standards.

BACKGROUND OF THE INVENTION

ETSI has defined a number of communication standards so that suppliers can supply independently-designed equipment that supports the same technology and are able to inter-operate with equipment from other suppliers that is compliant with that standard. One such data communication standard developed by ETSI is the Digital Video Broadcasting-Terrestrial (DVB-T) standard (ETSI EN 300 744), which has been developed for digital television sets and set-top boxes.

A more recent variation of the DVB-T standard is the DVB-H standard (ETSI EN 302 304) that incorporates enhanced features to allow improved reception of digital video broadcasting services for mobile devices. The DVB-H standard is particularly adapted for receivers that are battery powered. It is also particularly adapted for use for use with receivers that are liable to receive transmissions at a variety of heterogeneous conditions and locations, such as indoor, outdoor, moving at pedestrian speed, within a moving vehicle, which require robust reception and signal processing techniques to reduce or eliminate errors in reception.

One feature that has been incorporated within the DVB-H standard that facilitates this aim of mobile reception is the use of Multi Protocol Encapsulated-Forward Error Correction ('MPE-FEC') of received data. MPE-FEC facilitates recovery of data by a receiver in situations of high data-packet loss, which can occur when a receiver is in a changing environment, for example when a receiver is moving. MPE-FEC regroups data into blocks (MPE-FEC frames) and performs forward error correction on these data blocks. For an efficient error correction mechanism, a common approach is to have MPE-FEC frames larger than 512 Kbits. Thus, a receiver operating within a DVB-H compatible system receives an MPE-FEC frame with up to 2 Mbit of data over a single channel in a relatively short time period, for example 200 millisecond.

Power saving is crucial. Digital video broadcast reception inherently consumes power from the battery even more than normal voice communication. To save power, the DVB-H standard has incorporated a technique of 'time-slicing'. Time slicing is a mechanism that regroups data into bursts. A burst is a quantity of data that is sent in a small amount of time. The next burst is sent after a significant time delay, and so on. During this period of time, bursts from other channels, programs or applications are sent. This feature of the broadcast transmission offers a possibility to the DVB-H unit to repeatedly power off components/circuits of the DVB-H unit's receiver chain to increase battery life. Generally, within the DVB-H standard, bursts and MPE-FEC frames correspond. This means there are an integer number of complete MPE-FEC frames per burst.

In particular, as shown in FIG. 1, each burst 10 of the relevant channel has a high signal bandwidth 12 and is followed by a period referred to as 'Off-time' 14 with essentially zero bandwidth. The average bandwidth level 16 over several bursts and Off-times is equivalent to a constant level whose value affects the receiver power consumption and which is lower the shorter each burst is and the smaller each burst's bandwidth is.

Specifically, the transmission of DVB-H data is organized in MPE-FEC frames. As shown in FIG. 2, such an MPE-FEC frame according to the DVB-H standard consists of 255 columns and N rows (the standard specifies multiple choices for the number of rows any one of which can be adopted with the present invention). The first 191 columns are referred to as an application table 20 and contain the payload or information data. The last 64 columns are referred to as a Reed Solomon ('RS') table 22 and are used by a Reed Solomon decoder in the baseband processor of the receiver to correct possible errors in the application table and also in the RS table itself as received. The MPE-FEC frame is not sent in one piece but smaller fractions.

There is a need for further improvement in the baseband processor power consumption and/or its error correction.

SUMMARY OF THE INVENTION

The present invention provides a method of reception and a receiver as described in the accompanying claims.

DETAILED DESCRIPTION OF THE PREFERRED EMBODIMENTS

Figure 1:
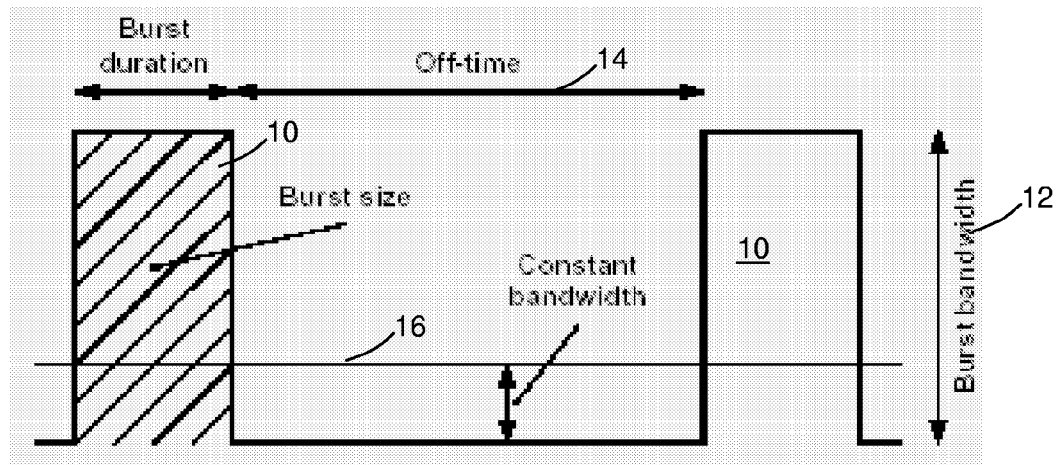
FIG. 1 is a schematic diagram of a DVB-H signal to be received by a receiver in accordance with the DVB-H standards.
Figure 2:
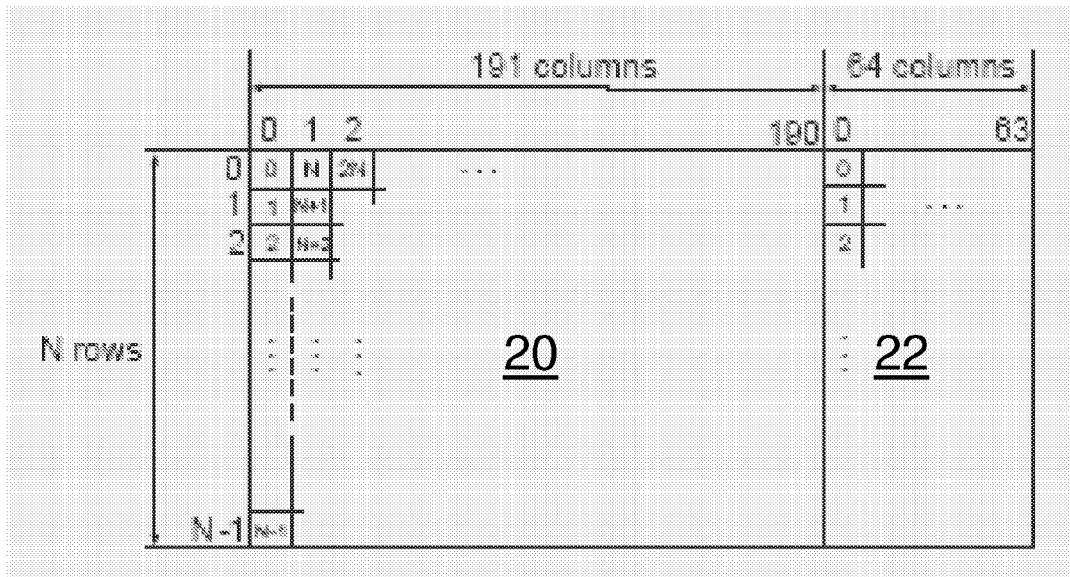
FIG. 2 is a schematic diagram of an MPE-FEC frame in the DVB-H signal of FIG. 1 showing byte positions.

In DVB-H, the contents to be transmitted come in the form of IP datagrams, which are passed to the Multi-Protocol Encapsulation with Forward Error Correction (MPE-FEC) entity. It is a method to deliver Reed Solomon (RS) parity data for datagrams delivered on Multi-Protocol Encapsulation sections. This is accomplished through the introduction of an additional level of error correction at the MPE layer. By adding parity information calculated from the datagrams and sending this parity data in separate MPE-FEC sections, error-free datagrams can be achieved after the MPE-FEC decoding even in the presence of very poor reception conditions. The MPE-FEC frame of the DVB-H standard is arranged as a matrix with 255 columns and a flexible number of rows as shown in FIG. 2. The maximum allowed value for the number of rows is 1024, which makes the total MPE-FEC frame size almost 2 Mbits as each position in the matrix hosts one information byte. The possible number of rows is 256, 512, 768 or 1024 in accordance with the DVB-H standard. The left part 20 of the MPE-FEC frame, consisting of the 191 leftmost columns, is dedicated for IP datagrams and possible padding, and is called the application data table. The right part 22 of the MPE-FEC frame, consisting of the 64 rightmost columns, is dedicated for the parity information of the FEC code and is called the RS data table.

As shown in FIG. 2, IP datagrams are introduced one by one, starting with the first byte of the first datagram in the upper left corner of the matrix and going downwards to the first column. The length of the datagrams may vary arbitrarily from datagram to datagram. The maximum datagram size, including the header, is 4080 bytes (see DVB Document A079, April 2004: IP Datacast Baseline Specification). Immediately after the end of one datagram the following datagram starts. If a datagram does not end precisely at the end of a column, it continues at the top of the following column.

Figure 3:
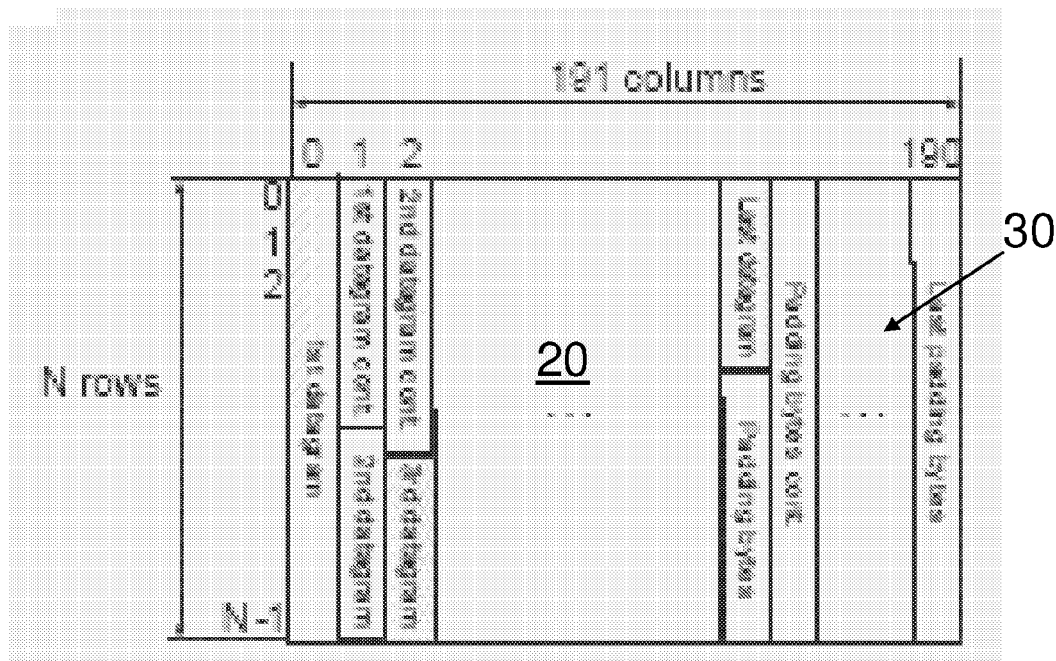
FIG. 3 is a schematic diagram of an application table in the MPE-FEC frame of FIG. 2.

When all datagrams have been entered in the application data table, all unfilled byte positions are padded with zero bytes, which makes the leftmost 191 columns completely filled, as shown in FIG. 3 at 30. These padding columns are used only for calculation of parity bytes and will not be transmitted later over the air interface.

Figure 4:
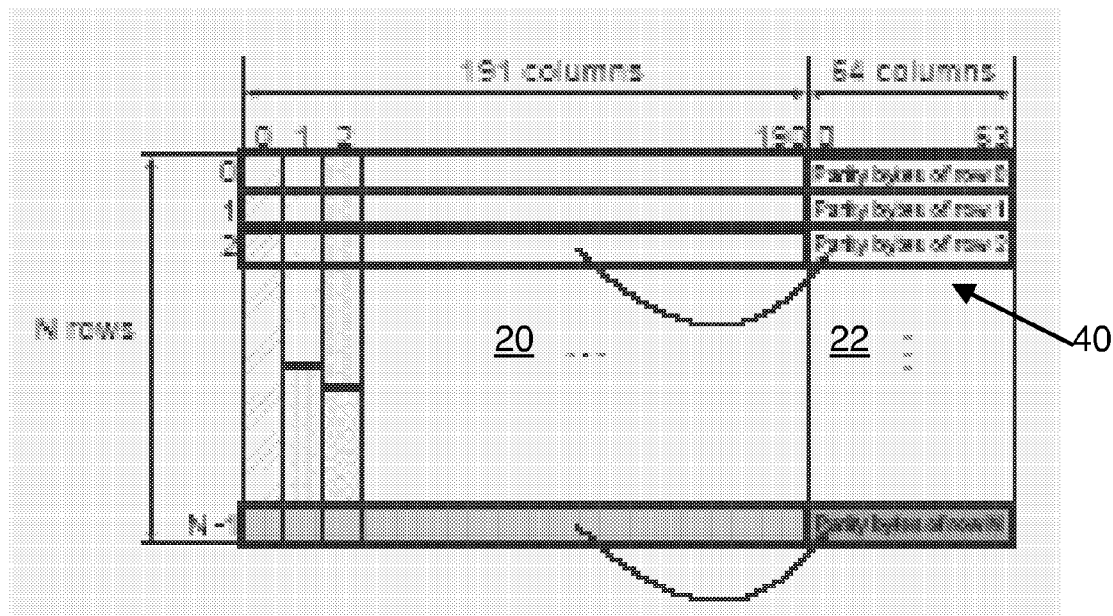
FIG. 4 is a schematic diagram of the MPE-FEC frame of FIG. 2 showing RS data table layout.

Each row of the RS data table 22 contains one RS code word generated using Reed-Solomon code (255,191,64) consisting of 64 parity bytes generated with all the leftmost 191 columns filled. For every row of 191 bytes of the filled application data table, the Reed-Solomon code generates one row of 64 bytes that is written in a horizontal way in the RS data table until the N rows are filled as shown in FIG. 4 at 40.

Figure 5:
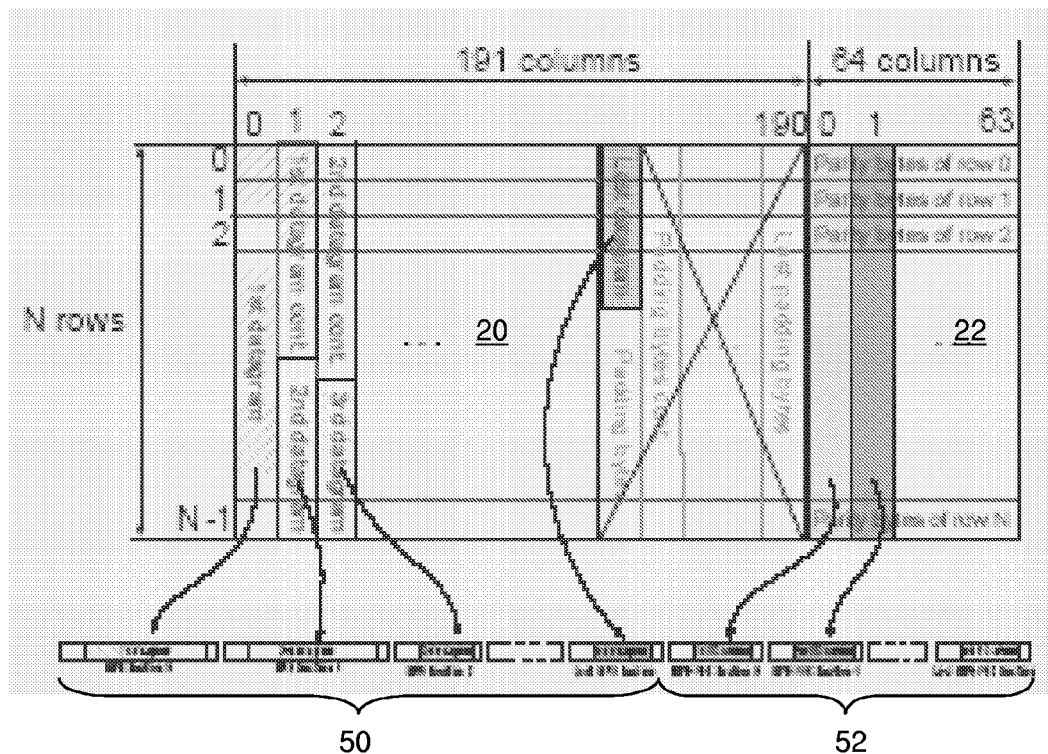
FIG. 5 is a schematic diagram of the MPE-FEC frame of FIG. 2 and of a corresponding Data Transport Stream showing the relation of content layouts.
Figure 6:
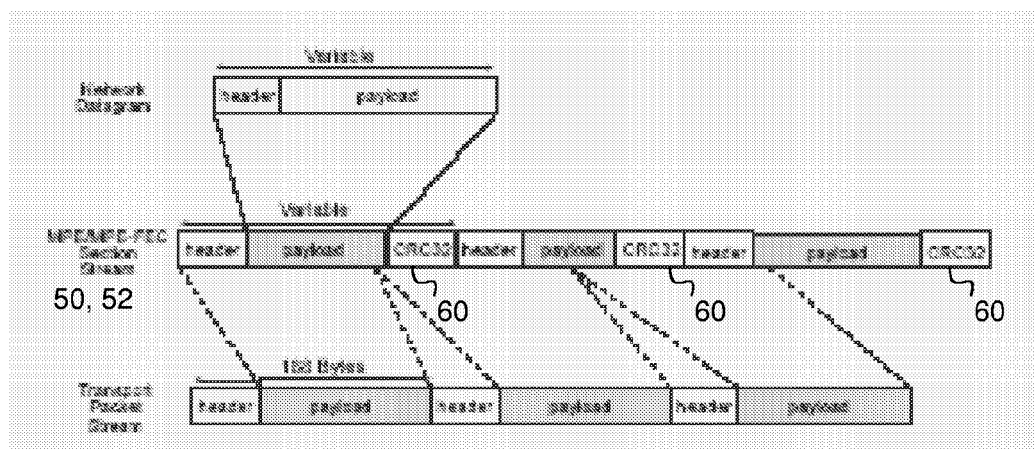
FIG. 6 is a schematic diagram of datagrams and the Data Transport Stream of FIG. 5 showing the relation of content layouts.

For the transmission over the air interface the MPE-FEC frame will be encapsulated in MPE and MPE-FEC sections 50 and 52 (see FIG. 5). The sections will be carried in Transport Stream (TS) packets (see FIG. 6). The IP datagrams are carried in MPE sections in compliance with the DVB-H standard. Each delivered MPE section shall contain one complete valid network datagram with a valid IP header. For each MPE-FEC frame, at least one MPE section shall be delivered. For encapsulated datagrams, the maximum section size is 4096 bytes (4080 bytes of datagram+16 bytes of section overhead), matching with the maximum number of bytes in an MPEG-2 private section (see ISO/IEC 13818-1: Information technology—Generic coding of moving pictures and associated audio information: Systems).

The last section with application data table information contains in its header a table boundary flag which indicates the end of the IP datagrams within the application data table. The RS data table information is carried in MPE-FEC sections. Each MPE-FEC section carries exactly one column of RS data table. The number of application data padding columns is signalled with 8 bits in the header of the MPE-FEC sections; the allowed range is 0 to 190. This value is needed only for the decoding. Each section (MPE or MPE-FEC) carries in the section header a start address for the payload: the byte position in the application data table or in the RS data table of the first byte of the section payload. At the end of every MPE and MPE-FEC sections, there is a Cyclic Redundancy Check ('CRC') field 60 of 32 bits (CRC-32 field) calculated over the entire section to detect the erroneous sections at the receiver side. The CRC field enables the presence or absence of errors in the received section to be checked.

The resulting MPE-sections are sent in the same order as the datagrams were written in the table. For the MPE-FEC sections, they are sent analogously per column order, from the left column to the right column.

To accomplish the transmission in TS packets, the obtained stream of MPE and MPE-FEC sections is divided in groups of 184 bytes. The splitted sections are introduced, keeping their ordering, in MPEG-2 transport packets with 4 bytes for the transport packet stream header, constituting packets of 188 bytes length. Depending on the size of the sections, one transport packet payload may contain one or more sections, and one section may be fragmented into one or more transport packet payloads. A burst is defined as a sequence of MPEG-2 transport stream packets containing in the payload bytes a complete MPE-FEC frame.

When the decoder begins to receive data, it has an empty MPE-FEC frame structure with all its byte positions marked as "unreliable". With the byte position address indicated in the header of every received section, the receiver will then be able to put the received datagram in the correct byte positions of the application data table or RS data table. The CRC-32, which detects erroneous sections, will allow these positions to be marked as "reliable" or "unreliable". All the empty holes of the MPE-FEC frame will remain as "unreliable" bytes. If MPE-FEC sections are received, the receiver introduces the number of padding bytes in the application data table, as indicated in the MPE-FEC sections. It marks these padding bytes as "reliable". If the receiver did not receive the last MPE section correctly it will have to assume that all byte positions after the last correctly received section until the first padding column are lost data, and mark the corresponding bytes as "unreliable". After this procedure, all byte positions within the MPE-FEC frame are marked as "reliable" or "unreliable". With this reliability information, also called erasure information, the RS decoder is able to correct up to 64 such bytes per 255-byte codeword. It should be noted that any 64 bytes can be corrected, i.e. it does not matter whether 1 bit or all 8 bits are in error. If there are more than 64 unreliable byte positions in a row, the RS decoder will not be able to correct anything and will therefore just output the bytes without error correction. It will have anyway the knowledge about the positions of any remaining byte errors. If a datagram is only partly corrected, the receiver will be able to detect this and (optionally) discard this datagram. If erasure information is not used, the RS decoder will allow correcting up to 32 random erroneous bytes in a received word of 255 bytes.

Even though DVB-H offers a good power consumption improvement in relation to DVB-T, further power saving improvement is vital for the device battery life. There are two main ways in which embodiments of the present invention may be able to improve the power consumption:

Omitting RS columns in reception processing

Carrying out half the RS decoding in post-processing

The erasure information will be important for any of the quoted power saving proposals. The use of these two ways to save power in embodiments of the invention is described in more detail below and the relation to the erasure information providing a decision criterion during signal reception and error correction.

Figure 7:
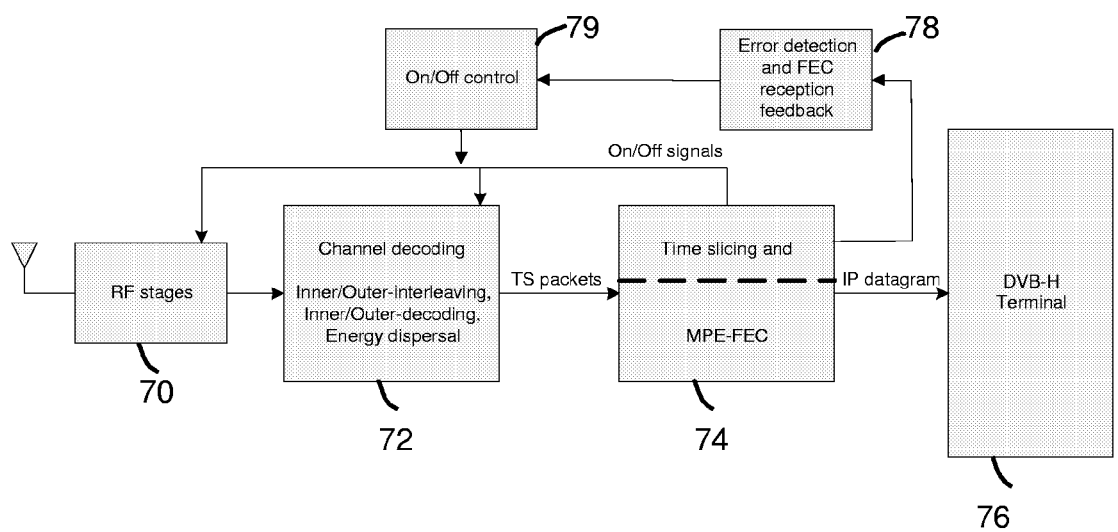
FIG. 7 is a block schematic diagram of one embodiment of a DVB-H receiver in accordance with the present invention, given by way of example.

FIG. 7 shows a DVB-H receiver in accordance with an embodiment of the invention. The receiver comprises RF stages for receiving the RF signals from an antenna and converting them down to baseband. The RF signal from the RF front end 70 is subjected in a decoder 72 to channel decoding, inner/outer interleaving, inner/outer decoding and energy dispersal to extract TS packets. IP datagrams are then produced by a processor 74 and supplied to a DVB-H terminal 76 after performing error correction and other DVB-H signal processing. Error detection and FEC reception data (that is to say erasure information) from the processor 74 are fed back by a feedback circuit 78 to an On/Off control circuit, which selectively disables (or stops) at least components of the receiver in order to save power consumption once sufficient MPE-FEC data has been received.

Figure 8:
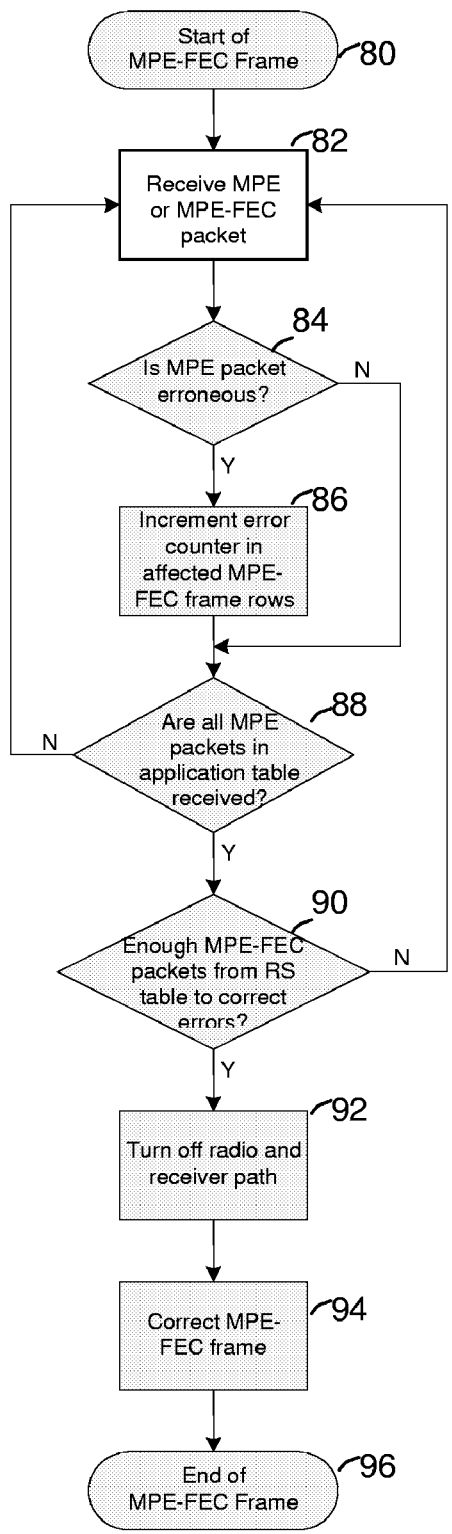
FIG. 8 is a schematic flow chart of one example of a method of receiving and decoding a DVB-H signal in accordance with the present invention.

FIG. 8 shows the process applied by the terminal 76, the feedback 78 and the On/Off control 79 in this example of the invention. At the start 80 of an MPE-FEC frame, an MPE packet is received at 82. A check is made at 84 whether the received packet is "unreliable"—that is to say identified as erroneous by the CRC data and other erasure information available. If the packet is "unreliable", an error counter for the affected MPE-FEC frame rows in the On/Off control 79 is incremented and the process passes to a decision at 88 whether all MPE packets of the MPE-FEC frame, constituting the application table 20, are received.

If the packet received was not identified as "unreliable" at 84, the process passes directly to decision 88. If the decision at 88 is negative, the process reverts to 82 to receive the next packet. If the decision at 88 is positive, the process passes to a decision at 90 whether sufficient MPE-FEC packets have been received to correct the "unreliable" packets received. If insufficient MPE-FEC packets have been received, the process reverts to 82 to receive the next packet. If, however, sufficient MPE-FEC packets have been received to correct the "unreliable" packets received, the process turns off at least components of the RF and signal processing stages that are not needed for error correction and signal processing at 92, in order to save power consumption, and then proceeds to error correction of the MPE-FEC frame at 94, the reception and correction of the frame then terminating at 96.

As indicated above, if all the application data table sections have been received correctly the receiver does not need to receive any MPE-FEC sections and can be switched off immediately the application table and CRC information is received. If the application data table has any error, then a number of MPE-FEC sections are received to accomplish the error correction. As time between bursts (off time) is directly related to power saving, receiving only the necessary RS columns and switching off the receiver without receiving the remaining RS columns results in a power consumption improvement. The number of columns that may be omitted will depend on the number of errors/erasures in the MPE-FEC frame and the forward error correction capability of the decoder. The exact components that are switched off or to standby are chosen as a function of the power saving that can thus be obtained and the time taken to switch the component back on, for example, which may limit its availability for the power saving.

The possible minimum and maximum Off-times depend on the quantity of data received from the burst. The maximum Off-time and maximum power saving will occur when only the information data (the data corresponding to the application Data Table) is received and the receiver switches off without receiving any RS columns. No power saving improvement will be accomplished when the Off-time will be minimal, that is when all the complete burst is received (Information data+RS data). In that case, the Reception time (Rt) will be maximal and will be the same as the Burst duration (Bd). Data and signalling are contained in the same burst. But since not the full signalling data is needed, it will not be a problem to power down before.

Considering the MPE-FEC frame architecture, the parity information constitutes 25% of its total content. As a result, omitting one RS column would suppose omitting 0.39% of the MPE-FEC frame content. Since the number of overhead bytes of the sent stream varies depending on the size of the included datagrams, it is difficult to determine the relation between omitted columns and exact power saving in terms of percentage with respect to standard DVB-H. If we do not consider any signalling in the burst, the maximum power saving may vary between 19% and 25.4%. To simplify, we can approximate the power saving percentage as the represented percentage of the RS columns in the MPE-FEC frame architecture.

In another way, to give an absolute value that would allow us to know how much power saving consumption is achieved, the duration of RS column transmission may be calculated as the ratio of the number of TS packets with complete omitted RS information (multiplied with 188 byte) divided by the burst bandwidth. Depending on the characteristics of the terminal device, a certain duration will be translated in a specific power consumption.

At the decoder side, omitting one RS column is equivalent to adding an error in each omitted byte. As seen previously, the RS decoder is able to correct up to 32 random erroneous bytes and 64 random erroneous bytes when reliable erasure information is used. So, to attain an output without any errors, the sum of the errors/erasures plus the number of omitted rows will not have to exceed 32 and 64 bytes respectively.

The Reed-Solomon decoding process is constituted by the following steps (see Riley M. and Richardson I.: *Reed-Solomon Codes—An introduction to Reed-Solomon codes: principles, architecture and implementation*.):

Syndrome Calculation. A calculation similar to parity calculation.

Finding the Symbol Error Location. This involves finding an error locator polynomial and finding the roots of this polynomial. Simultaneous equations with 32 unknowns have to be solved.

Finding the Symbol Error Values.

When we talk about "Half RS Decoding", we refer to using the erasure information provided by the CRC-32 while avoiding the calculation of the error locator polynomial. In this way, power saving will be achieved in the post-processing stage. Thus, two RS decoding ways may be used:

a) "Half RS Decoding" (Use of the erasure information)—In this case, the information provided by the CRC-32 will allow to mark the location of the erroneous bytes. Maximum 64 erasures will be able to be corrected.

Advantages: Faster processing since only half of the RS performance will be needed (it will not be necessary to calculate the error location polynomial or evaluate it). This characteristic will allow a supplementary power saving and cheaper decoders.

Drawbacks: An important number of correct bytes may have been marked as unreliable. So, the decoder may need much more RS columns than necessary or may not be able to correct a quantity of errors that could have been corrected with a full RS decoding.

b) "Full RS Decoding"—The RS decoding will be accomplished without any erasure information. Maximum 32 errors will be able to be corrected.

Advantages: No additional errors are added.

Drawbacks: The RS decoding process will be slower. It will need more power consumption and will be more expensive. If errors occur a minimum of 32 MPE-FEC RS columns should be received.

At the receiver side, the erasures are the information that allow us to deduce the minimum necessary number of RS columns we have to receive to accomplish the Forward Error Correction and help us to decide whether the "Half" or "Full" RS decoding is more suitable. Likewise, after the correction, the remaining "unreliable" bytes are the elements that allow us to do a quality evaluation and help us to provide a threshold to attempt handover. If we base the decoding decisions on CRC-32 information, the most important expectation from this code is a very low probability for undetected errors. The probability of undetected errors also depends on the error distribution and the data length. The asymptotic limit could be assumed as $1*2^32=2.3*10^10$ of failing to detect an error in the data (see Barr M.: For the Love of the Game—Embedded Systems Programming). The chances of an erroneous data going undetected can be supposed small but the RS decoder can also improve this reliability.

In addition to the CRC-32, which detects erroneous sections, the RS decoder also very reliably detects erroneous TS packets since the TS packet structure has its own CRC. If the MPEG-2 demultiplexer discards erroneous packets it can be designed not to build sections, which contain lost TS packets. In this way almost only correct sections would be built and the role of the CRC-32 would be to provide additional error detection functionality, which normally is not needed. In other words, sections can contain up to 4080 bytes whereas TS packets only 184. Therefore, if we know from the TS layer that a TS packet is wrong, we only need to mark 188 bytes as "unreliable", whereas up to 4080 bytes must be marked as "unreliable" if we only rely on the section CRC-32.

As we have seen, incorrect sections may be discarded and not placed in the MPE-FEC frame. This could be because of the decoder configuration (to simplify the processing), due to irrecoverable errors in TS packets (such as wrong packet identification flag) or simply because of lost packets. In all these cases, the "unreliable" bytes of the MPE-FEC frame will coincide with the real errors, or at least they will be very close to them. The erasure information and the output quality evaluation will be very precise. If the RS decoder does not discard erroneous sections, it will try to put the "unreliable" data in the corresponding MPE-FEC frame position assuring to not overwrite any "reliable" byte. Since the CRC-32 marks entire sections, all the bytes of one datagram may be marked as "unreliable" even if there is only one unique erroneous byte. So, we will have to keep in mind that we may have more "unreliable" bytes than real erroneous bytes. The erasure information will be far from the real errors and the output quality evaluation will be imprecise and will provide worse error rates than the reality.

In one embodiment of a method of signal processing in accordance with the present invention, in order that the decoder receives the minimum necessary RS columns, we base the switch-off decision on the erasure information. It will be necessary to see the quantity of "unreliable" bytes in a row and then go receiving the necessary RS columns to accomplish the forward error correction. Note that not receiving any RS column will be equivalent to 64 erroneous bytes per row. So, the number of necessary RS columns to receive to accomplish the complete correction are at least:

For the "Full RS Decoding": equal to 32 plus the maximum number of "unreliable" bytes in any row until the switching-off moment. This will assure that the maximum number of "unreliable" bytes in a row will be at most equal to 32. It will be necessary to receive at least 32 RS columns in order to be able to perform the error correction.

For the "Half RS Decoding": equal to the maximum number of "unreliable" bytes n any row until the switching off moment. This will assure that the maximum number of "unreliable" bytes in a row will be at most equal to 64 and the error correction will be possible.

To quantify the results obtained, we applied the "full RS decoding" and the "half RS decoding" to correct an MPE-FEC frame with the same erasure information in both of the cases. The simulations were developed for an MPE-FEC frame of 1024 rows and datagrams of 113 bytes length. These sizes allowed us to show for a same MPE-FEC frame a wide range of possible results when different bit error rates were applied.

The "full" RS decoding needs to receive at least 32 columns to be able to accomplish a correction. In that case since the number of errors by row is very low, the decoder only needs a few more RS columns than 32. As far as the half RS decoding is concerned, it loses its correction capabilities as the number of "unreliable" bytes increases. The transition between the capability to begin to correct the errors and have the complete correction accomplished (the transition between maximum BER and zero BER) bears a direct relation to the uniformity on the number of errors or "unreliable" bytes between the rows. If "full" RS decoding is applied, the relation is based on errors and if half RS decoding is applied, it is based on erasures. Therefore, the nearer the quantity of errors/erasures in the rows is, the more abrupt will be the transition. The maximum BER may be slightly below the indicated BEP because the BEP refers to the entire MPE-FEC frame and the BER only to the application data table.

The power savings for six different real video sequences versus the mean frame size in byte have been evaluated to analyze the potential power savings. The power saving values obtained are between 17% and 22%. Our first observation of the achieved results is that the larger the mean frame size becomes, the lower the power saving. This is based on the fact that for shorter frames the errors have less impact than for the longer frames, because less bytes are marked as unreliable. This is especially true if frames are larger than one MPE-FEC column.

The embodiments of the present invention described implement a strategy for additional power saving in DVB-H systems using the MPE-FEC coding. By column omission we can yield power saving values up to 25%, typically between 17% and 22%. The final power saving values depend on the channel errors and the traffic pattern of the served video sequence. The embodiments of the present invention described can be fully compliant with the DVB-H standard and can therefore be implemented in all DVB-H handhelds.

The invention claimed is:

1. A method comprising:
receiving a signal in bursts, the bursts include frames each including payload data and error correction data received in separate time periods, the bursts being separated by time intervals during which power is saved by disabling at least some signal processing components of the receiver;
wherein the signal processing components of the receiver are disabled to save power before all the error correction data for all the frames in the bursts are received.

2. A method as claimed in claim 1, wherein the signal processing components of the receiver are disabled to save power before all the error correction data in the bursts is received and processing of at least some subsequent error correction data is omitted.

3. A method as claimed in claim 2, wherein a Reed Solomon decoder is used in correcting errors in the received signal and the error correction data comprises a Reed Solomon table, the signal processing components of the receiver being disabled to save power before the complete Reed Solomon table for all the frames in the bursts is received.

4. A method as claimed in claim 2, wherein signal processing components of the receiver are disabled to save power before all the error correction data in the burst is received and part of the error correction is performed in post-processing.

5. A method as claimed in claim 1, wherein a Reed Solomon decoder is used in correcting errors in the received signal and the error correction data comprises a Reed Solomon table, the signal processing components of the receiver being disabled to save power before the complete Reed Solomon table for all the frames in the bursts is received.

6. A method as claimed in claim 1, wherein the signal processing components of the receiver are disabled to save power before all the error correction data in the bursts is received and part of the error correction is performed in post-processing.

7. A method as claimed in claim 6, wherein the signal processing components of the receiver are disabled to save power at a moment that is a function of time slicing packet information received in the signal.

8. A method as claimed in claim 1, wherein the signal processing components of the receiver are disabled to save power at a variable moment during the error correction data period.

9. A method as claimed in claim 1, wherein the received signal fulfils the requirements of the Digital Video Broadcast-Handheld standard.

10. A method as claimed in claim 9, wherein the signal processing components of the receiver are disabled to save power when sufficient error correction data has been received to correct sections identified as unreliable by erasure information from Multi Protocol Encapsulated-Forward Error Correction frames.

11. A receiver for receiving a signal in bursts, the bursts include frames each including payload data and error correction data received in separate time periods, the bursts being separated by time intervals, the receiver comprising:
signal processing components; and
control circuit for disabling at least some of the signal processing components of the receiver during the time intervals between bursts, wherein the control circuit is arranged to disable the signal processing components of the receiver to save power before all the error correction data for all the frames in the bursts are received.

12. A receiver as claimed in claim 11, wherein the control circuit is arranged to disable the signal processing components of the receiver to save power before all the error correction data in the bursts is received and omit processing of at least some subsequent error correction data.

13. A receiver as claimed in claim 11, including a Reed Solomon decoder for use in correcting errors in the received signal, the error correction data comprising a Reed Solomon table, the control circuit being arranged to disable the signal processing components of the receiver to save power before the complete Reed Solomon table for all the frames in the bursts is received.

14. A receiver as claimed in claim 11, wherein the control circuit is arranged to disable the signal processing components of the receiver to save power before all FEC data in the bursts is received and perform part of the error correction in post-processing.

15. A receiver as claimed in claim 12, including a Reed Solomon decoder for use in correcting errors in the received signal, the error correction data comprising a Reed Solomon table, the control circuit being arranged to disable the signal processing components of the receiver to save power before the complete Reed Solomon table for all the frames in the bursts is received.

16. A receiver as claimed in claim 12, wherein the control circuit is arranged to disable the signal processing components of the receiver to save power before all FEC data in the bursts is received and perform part of the error correction in post-processing.

17. A receiver as claimed in claim 11, wherein the control circuit is arranged to disable the signal processing components of the receiver to save power at a variable moment during the error correction data period.

18. A receiver as claimed in claim 17, wherein the control circuit is arranged to disable the signal processing components of the receiver to save power at a moment that is a function of time slicing packet information received in the signal.

19. A receiver as claimed in claim 11, suitable for receiving a signal that fulfils the requirements of the Digital Video Broadcast-Handheld standard.

20. A receiver as claimed in claim 19, wherein said control circuit is responsive to reception of sufficient error correction data for correcting sections identified by erasure information from Multi Protocol Encapsulated-Forward Error Correction frames as unreliable to disable the signal processing components of the receiver to save power.

* * * * *